Patented Oct. 23, 1923.

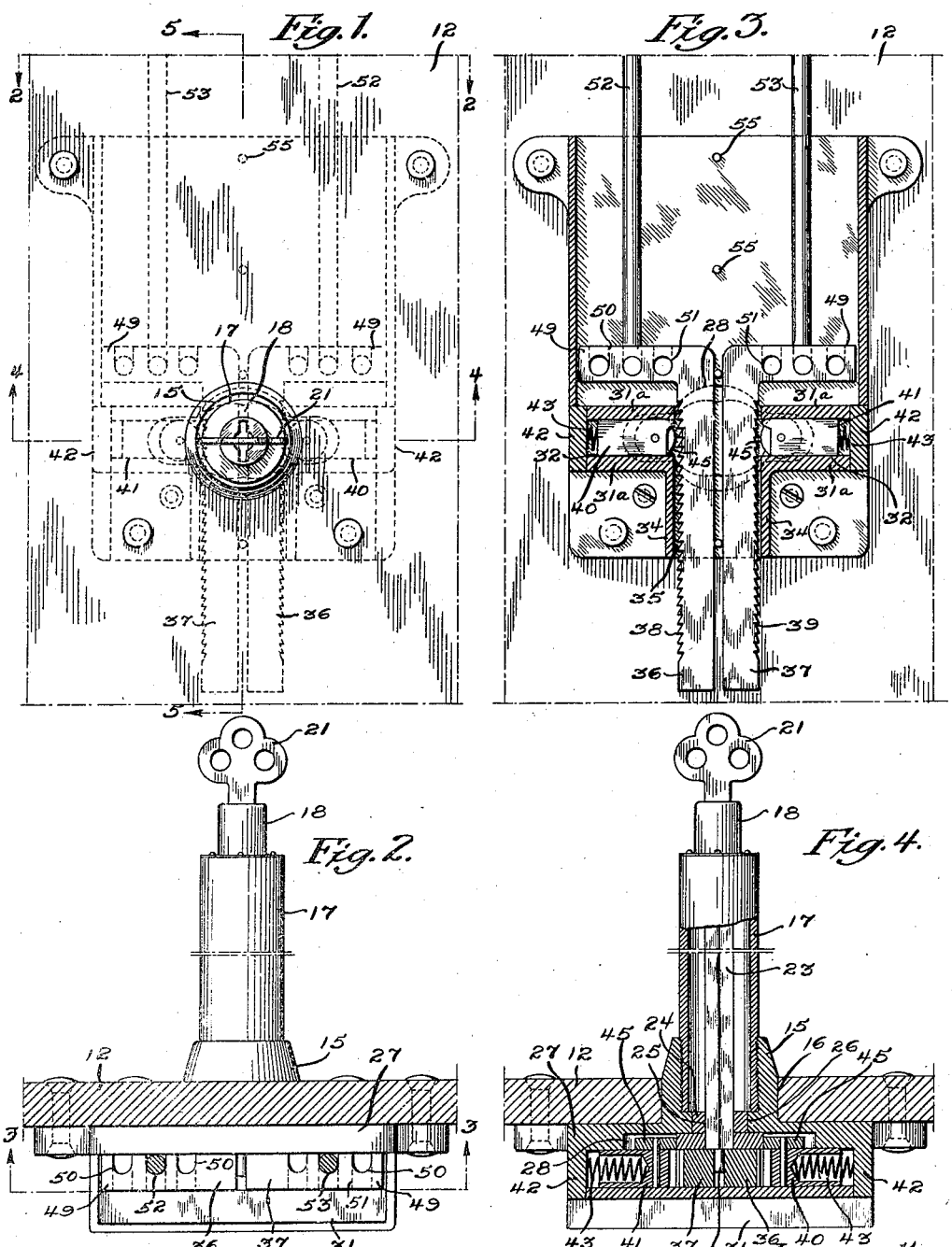
Oct. 23, 1923.                                              1,471,447
T. N. BURGHART
LOCKING DEVICE FOR AUTOMOBILES
Filed July 14, 1921         2 Sheets-Sheet 1

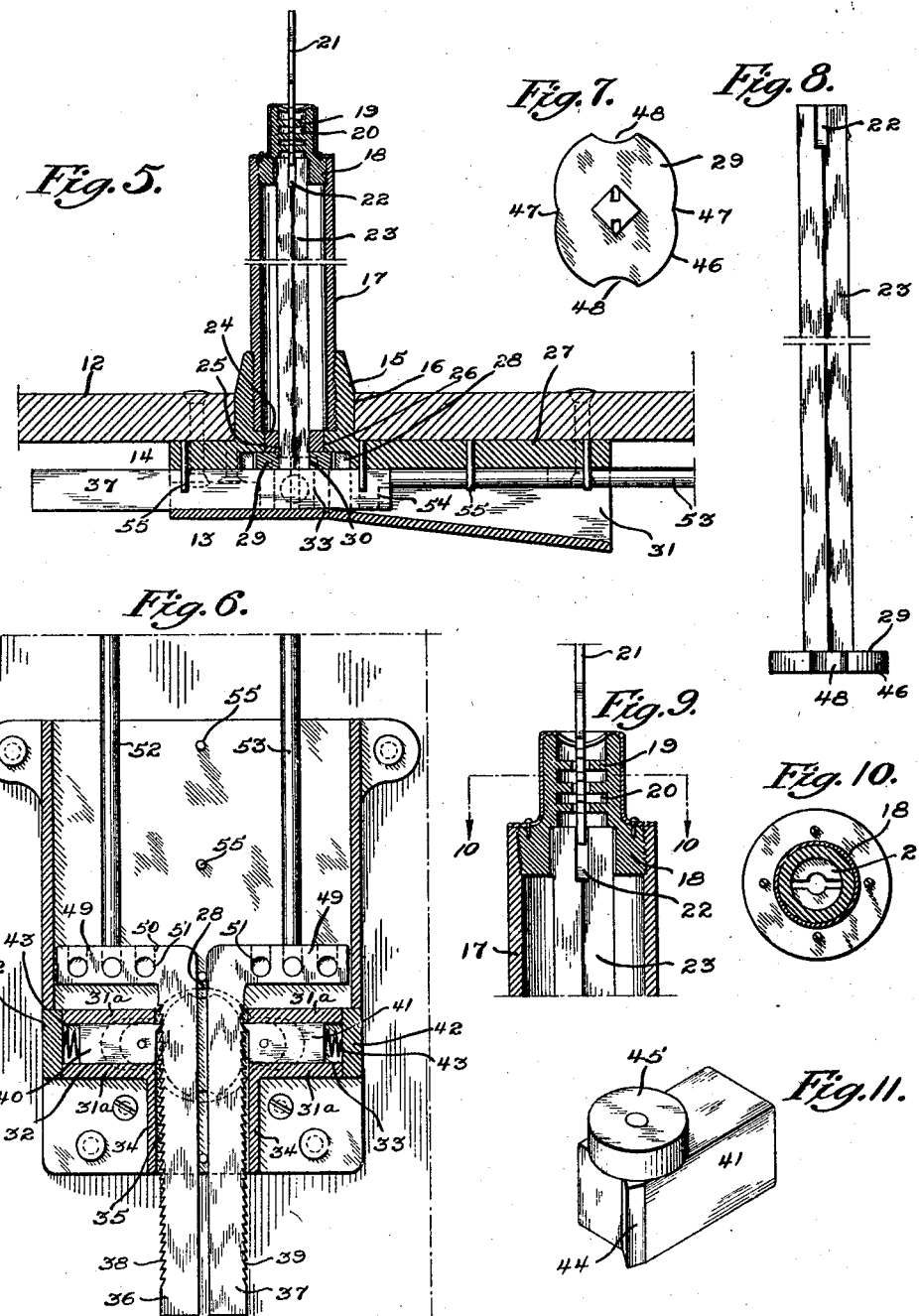

1,471,447

UNITED STATES PATENT OFFICE.

THOMAS N. BURGHART, OF PHILADELPHIA, PENNSYLVANIA.

LOCKING DEVICE FOR AUTOMOBILES.

Application filed July 14, 1921. Serial No. 484,539.

*To all whom it may concern:*

Be it known that I, THOMAS N. BURGHART, a citizen of the United States, residing at Philadelphia, in the county of Philadelphia and State of Pennsylvania, have invented certain new and useful Improvements in Locking Devices for Automobiles, of which the following is a specification.

My present invention relates to locking devices and particularly to devices for locking the levers, such for example as the foot-operated levers of automobiles to prevent an unauthorized person from actuating the levers so that the automobile cannot be operated when the parts are in their locked positions. Furthermore my present invention relates to the same general type of device disclosed in my co-pending United States application for patent, Serial No. 452,955, filed March 17, 1921.

One object of the device of my present invention is to provide locking means which can be moved by resilient means into positive locking position.

Another object is to so construct my improved device that it can be readily attached to automobiles of various types in which the operating levers have different arrangements and as such is adapted without change to permit the ready attachment to levers which are spaced at different distances apart.

A still further object is to make my improved device of a durable construction and so that it can be easily and cheaply manufactured.

These objects, and other advantageous ends which will be described hereinafter, I attain in the following manner, reference being had to the accompanying drawings in which—

Figure 1 is a top plan view showing my improved device attached to the floor of an automobile, Figure 2 is a section taken on the line 2—2 of Figure 1, Figure 3 is an inverted sectional plan view taken on the line 3—3 of Figure 2, Figure 4 is a sectional elevation taken on the line 4—4 of Figure 1, Figure 5 is a section taken on the line 5—5 of Figure 1, Figure 6 is a view of similar character to that shown in Figure 3 illustrating the parts in their locked positions, Figures 7 and 8 are detail views of certain of the parts of the device, Figure 9 is an enlarged fragmentary sectional elevation illustrating the key-controlling portion of the device.

Figure 10 is a section taken on the line 10—10 of Figure 9, and

Figure 11 is a perspective view of certain of the parts of my improved device.

Referring to the drawings, 12 represents a portion of the floor of an automobile and to the under surface of the floor 12 is secured a housing 13 which is preferably made of metal and includes a main channel section 14 which has an upright hollow boss 15 which projects through a hole 16 in the floor 12. A tubular standard 17 fits within the boss 15 and at its top includes a cap 18 having partitions 19 spaced apart; said partitions having slots 20 to permit a key 21 to be inserted downwardly thereto to engage the angular upper end 22 of an actuating post 23. This post 23 is angular in cross section and within its length fits within an angular hole in a disk 24 which is rotatably mounted in a hole 25 provided by a flange 26 in the lower portion of the boss 15. The channel section 14 includes a plate portion 27 which includes a recess 28 in which an actuating member 29 is located; said actuating member having an angular hole 30 in which the lower end of the post 23 fits so that it will be understood that when the key 21 is inserted through the cap 18 said key can be used as a lever for rotating the post 23, and the actuating member 29 will also be rotated.

The housing 13 includes a lower channel section 31 which has upwardly extending portions 31$^a$ providing transversely extending guideways 32 and 33 as shown in Figures 3 and 6. In similar manner the section 31 has upwardly extending portions 34 which provides a guideway 35 extending in the direction of the length of the device substantially at right angles to the guideways 32 and 33; said guideways 32 and 33 being located at opposite sides of the guideway 35. Locking bars 36 and 37 are slidably mounted within the guideway 35; said locking bars having teeth 38 and 39 on opposite edges; said teeth being opposed respectively to the guideways 32 and 33. Bolts 40 and 41 are slidably mounted in the guideways 32 and 33. The outer ends of the guideways 32 and 33 are closed by tongues 42 which depend from the channel section 14. Springs 43 bear against the tongues 42 and fit within recesses in the bolts 41 as shown in Figure 4; said springs being operative to move the bolts 41 toward each other; said bolts having ribs 44 which are tapered in cross section and movable into mesh with the teeth of the respective locking bars 36 and 37. Rollers 45 are pivotally mounted on the bolts 41 and are adapted to engage the edge surface 46 of the actuating member 29; said rollers extending into the recess 28 in the channel section 14. The surface 46 of the actuating member 29 has opposed depressions 47 and other opposed depressions 48; the portions of the surface 46 providing the depressions 47 being closer to the axis of rotation than are the portions of the surface 46 which provides the depressions 48. It will be noted that the springs 43 serve to move the rollers 45 into and keep them in contact with the surface 46 of the actuating member 29. When the depressions 47 are in line with the rollers 45, the springs 43 can move the bolts 41 with the ribs 44 in mesh with the teeth of the respective locking bars 36 and 37. However, when the actuating member 29 is turned to bring the depressions 48 in line with the rollers 45, the bolts 41 will be moved in opposite directions and the ribs 44 will be withdrawn from the teeth of the locking bars; the pressure of the springs 43 serving to hold the rollers in the depressions 48 and thereby prevent accidental turning of the member 29.

The locking bars 36 and 37 have laterally extending arms 49 which have laterally arranged groups of notches 50 in their upper surfaces as shown in Figure 2; said arms also having holes 51 which extend upwardly therethrough and communicate at their tops with the respective notches 50. These notches and holes of the arms 49 are arranged at spaced distances apart within the width of the device and serve as connecting means for links 52 and 53 which links may be attached in any suitable manner to the actuating levers of the automobile; said links 52 and 53 fitting within the notches 50 most suitable for them according to the spacing of the levers on the automobile. The links 52 and 53 have downwardly extending hooked portions 54 which fit within the holes 51 so as to longitudinally lock or secure the links to the locking bars. Guiding pins 55 depend from the channel section 14 at spaced distances apart in a straight row and serve as spacing and guiding means for the locking bars 36 and 37.

In the operation of the device when it is desired to lock the levers of the vehicle, the key 21 is rotated a quarter turn and removed; this action bringing the depressions 47 in alignment with the rollers 45 so that the springs 43 will move the bolts 41 toward the bars 36 and 37. Even though no one of the notches between the teeth of the locking bars is directly in line with the ribs 45, it is obvious that any attempt to move the levers will move the teeth into alignment with the ribs 44 of the bolts 41 and the springs 43 will then push the bolts so that the ribs 44 will snugly enter the notches between the teeth in the locking bars and prevent further movement of the locking bars. Thus by having the bolts movable into locking engagement by the springs a direct locking engagement between the bolts and the locking bars can also be secured even though the notches between the teeth of the locking bars are not in direct alignment with the ribs 44 of the bolts 41 when the key is turned.

When it is desired to unlock the device the key 21 is inserted and turned a quarter turn during which action the portions of the surface 46 of the actuating member 29 will operate upon the rollers 45 to withdraw the bolts from locking engagement with the locking bars and when the depressions 48 become in alignment with the rollers 45, the springs 43 will act to move the rollers 45 into the depressions 48 and thereby hold the actuating member 29 against accidental rotatable movement. However, the movement of the rollers 45 into the depressions 48 is not sufficient to permit the ribs 44 to enter the notches between the teeth of the locking bars.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A locking device for automobiles including a link adapted to engage with the actuating lever of an automobile; a housing; a guideway within the housing; a locking bar, slidable within the housing, having a laterally extending arm provided with spaced means for selectively securing the link to the locking bar, and means for locking the bar against movement.

2. A device of the character described including a housing providing a longitudinal guideway and laterally extending guideways; locking bars movable within said longitudinal guideway and having opposed rows of teeth; bolts slidable within said lateral guideways; springs for moving said bolts into locking engagement with the teeth of said bars; rollers carried by said bolts; and an actuating member having a surface for engagement with said rollers, said surface having opposed pairs of depressions at different distances from the axis of rotation of said member; substantially as described.

In testimony whereof I have signed my name to this specification in the presence of two subscribing witnesses.

THOMAS N. BURGHART.

Witnesses:
ELIZABETH GORBE,
CHAS. E. POTTS.